US006883513B2

(12) United States Patent
Bock

(10) Patent No.: US 6,883,513 B2
(45) Date of Patent: Apr. 26, 2005

(54) RACK OVEN AND ASSOCIATED RACK CARRIER

(75) Inventor: Michael Bock, Buckley, WA (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/656,842

(22) Filed: Sep. 5, 2003

(65) Prior Publication Data

US 2005/0051149 A1    Mar. 10, 2005

(51) Int. Cl.[7] ............................................. F24B 1/00
(52) U.S. Cl. ..................... 126/19 R; 99/443 R; 99/447; 99/479; 211/113
(58) Field of Search .................. 126/19 R, 20, 126/21 R, 21 A, 348, 369; 99/443 R, 467, 99/473, 474, 477, 479; 211/126.1, 126.2, 211/113

(56) References Cited

U.S. PATENT DOCUMENTS 2,440,513 A * 4/1948 Calavah et al. ............. 211/201
3,618,511 A * 11/1971 Matthews .................. 99/443 C
3,954,053 A    5/1976 Johansson et al.
4,202,259 A    5/1980 Johansson
4,527,707 A * 7/1985 Heymann et al. ......... 211/126.1
5,394,791 A * 3/1995 Vallee ....................... 126/21 A
5,617,839 A * 4/1997 Jennings et al. .............. 126/20

OTHER PUBLICATIONS

Exhibits A through C—prior art—Rack Lift—color photocopies of photographs.
Exhibits D and E—prior art—Rack—color photocopies of photograph.

* cited by examiner

Primary Examiner—Jiping Lu
(74) Attorney, Agent, or Firm—Thompson Hine LLP

(57) ABSTRACT

A rack oven includes a rack carrier with a main body ant at least one side support connected to the main body for movement between a rack holding position and a rack transfer position. The main body and side support form a rack receiving channel. The side support may be biased into one of the rack holding and the rack transfer positions.

16 Claims, 4 Drawing Sheets

RACK OVEN AND ASSOCIATED RACK CARRIER

TECHNICAL FIELD

The present invention relates generally to convection rack ovens used for baking items such as bread and, more particularly, to a rack carrier for receiving a food product rack in order to facilitate lifting and rotating the rack during a baking operation.

BACKGROUND

Rack ovens are generally equipped with a fuel-fed heating element and a fan for moving heated air throughout a baking chamber to provide a rapid distribution of hot air over the food product. Commercial ovens of this type include a baking chamber, which is sized to receive a rack having multiple shelves containing products to be baked; a power driven, rotating rack carrier to rotate the product as it is being cooked or baked; a heat exchanger such as one or more gas burners and an exhaust system to eliminate combustion gases or an electrical heating element; and a circulating system for directing hot air along a heated air flow path that passes through the baking chamber. Conventional rack ovens of the type for baking bread also generally include a steam generator for the introduction of steam into the oven for brief periods of time, usually at the beginning of the baking process, to impart a desired appearance to the baked food product.

Various types of food product racks exist in the industry. Improvements are regularly sought for a variety of reasons, including cost, ease of manufacture and reliability.

SUMMARY

In one aspect, a rack oven includes a chamber for receiving a rack, a door providing access to the chamber and a rack carrier for engaging a food product rack. The rack carrier includes a rotatable output member extending from the top of the chamber, a main body connected for rotation with the rotatable output member, wherein the main body and at least one side support define a rack receiving channel. The side support is movably connected with the main body for movement between a rack holding position relative to the main body and a rack transfer position in which the side support is moved at least outward from the main body. The side support is biased into one of the rack holding position and the rack transfer position. At least one support bracket is located within the channel for engaging a crossbar of a top portion of a rack.

In another aspect, a rack oven includes a chamber, a door providing access to the chamber and a rack carrier engaged with a food product rack. The food product rack includes a top portion with laterally spaced first and second side bars and a cross-bar extending between and connected to the laterally spaced side bars. The rack carrier includes a first side support with a lip engaging an underside of the first side bar and a second side support with a lip engaging an underside of the second side bar.

In a further aspect, a rack carrier for engaging a food product rack includes a shaft and a main body connected with the shaft. The main body and at least one side support define a rack receiving channel. The side support is movably connected with the main body and biased into a rack holding position relative to the main body. The side support is movable at least outward from the main body to a rack transfer position, and at least one support bracket is located within the channel for engaging a crossbar of a top portion of a food product rack.

In yet another aspect, a rack carrier for engaging a food product rack includes a main body, at least one side support movably connected with the main body. The main body and the side support define a rack receiving channel. The side support has a rack holding position relative to the main body and a rack transfer position relative to the main body. When moving from its rack holding position to its rack transfer position the side support moves outward and upward.

BRIEF DESCRIPITON OF THE DRAWINGS

DETAILED DESCRIPTION

Figure 1:
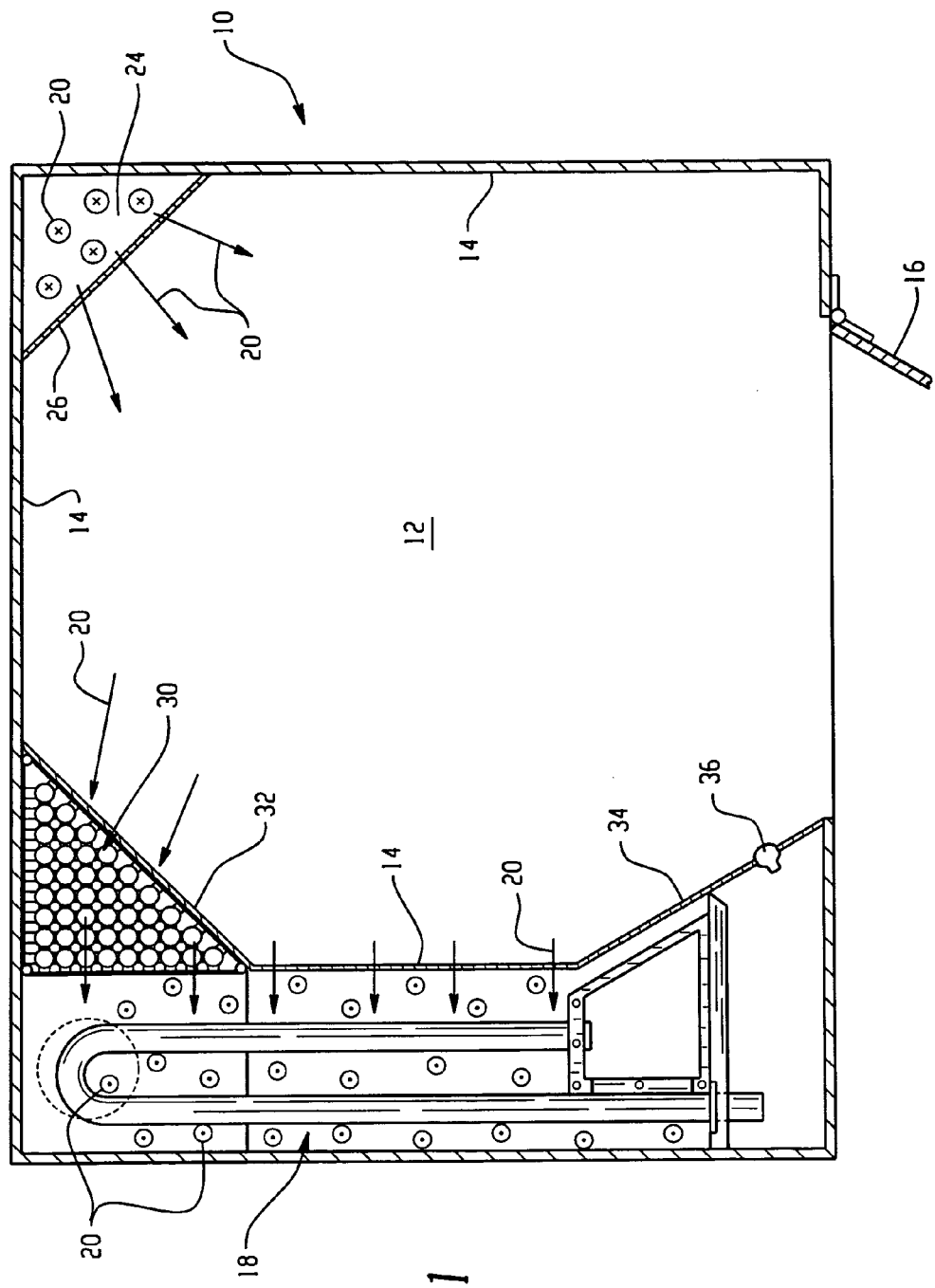
FIG. 1 is a top plan view of a rack oven.
Figure 2:
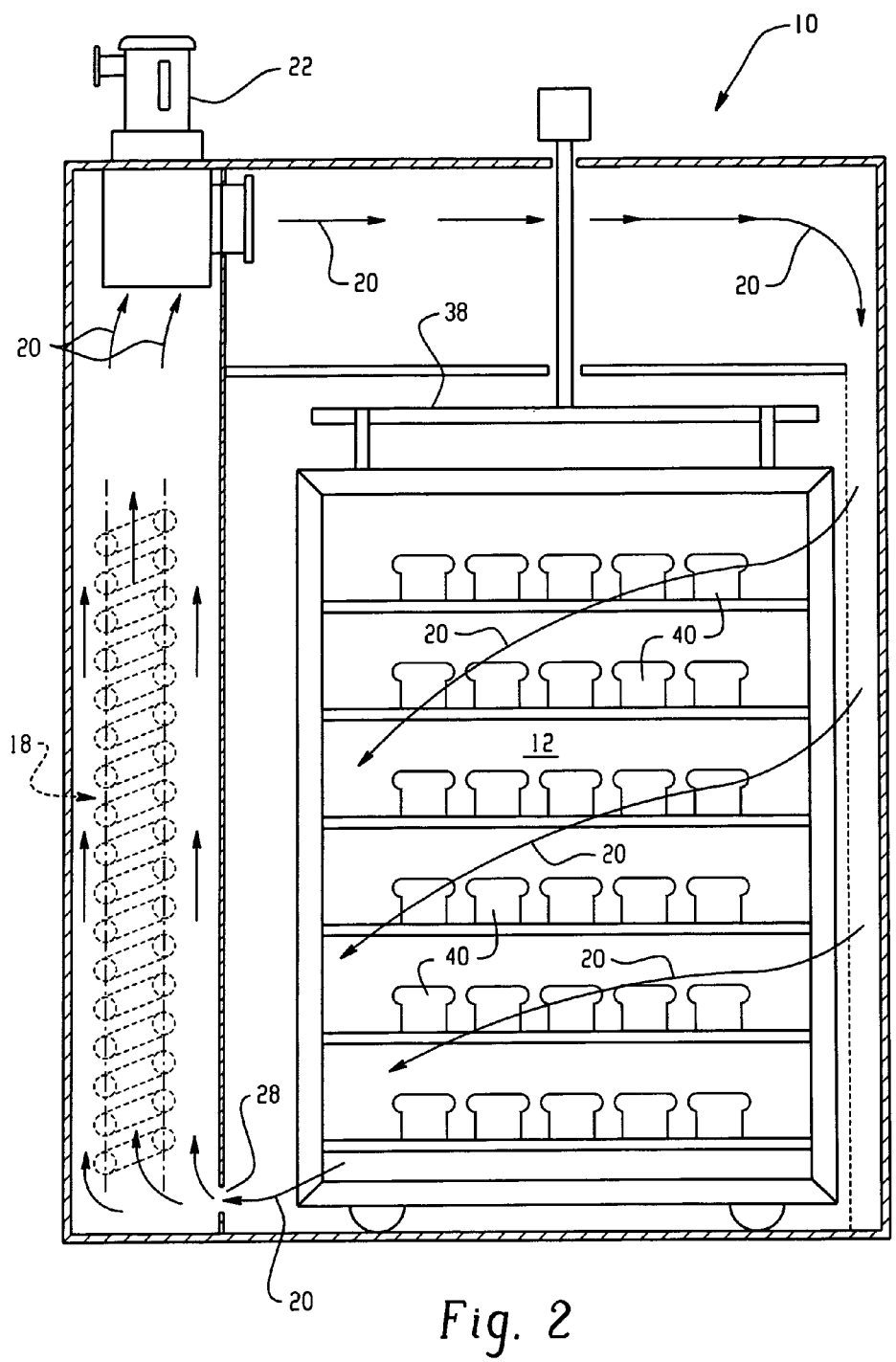
FIG. 2 is a front elevation view (partial cross-section) of the oven of FIG. 1.

Referring to FIG. 1, a top plan view of an oven 10 is shown. The oven 10 includes a baking chamber 12 defined by a plurality of walls 14. Door 16 (shown only in part) provides access to the baking chamber. A heat exchanger 18 is located outside the baking chamber 12. As shown by the arrows 20 in FIGS. 1 and 2, during a baking procedure a fan or other blower 22 may be operated to cause heated air to flow along an air flow path that extends upward through the heat exchanger 18 (illustrated with heat exchange tubes although other mechanisms such as resistive heating elements could be used), over the top of the baking chamber 12, downward through a corner channel 24, through a panel 26 into and through the baking chamber 12, through a slot 28 or series of openings in the left baking chamber wall 14 and back up through the heat exchanger 18. A portion of the heated air also flows through a corner located steam generator 30, with a panel 32 (having apertures or slots) separating the steam generator 30 from the baking chamber 12, and with wall 14 including an opening or openings that extend along the height of the steam generator 30 to provide the air into the heat exchanger 18. The steam generator 30 may take the form of a thermal mass, such as an iron mass that collects heat, and an associated source of water that delivers water onto the thermal mass, with heat of the thermal mass converting the water to steam. The panel 32 may also be solid (no apertures or slots) and mounted in a manner spaced from walls 14 and or the floor to provide air flow slots. A front, left corner panel 34 with one or more lights 36 positioned therein is also shown in FIG. 1. Also shown in FIG. 2 is a rotatable rack 38 within baking chamber 12, the rack holding goods 40 to be baked. The oven includes a rack carrier or lift and rotate mechanism (as known in the art) to lift and rotate the rack, which is shown generically in FIG. 2. The rack 38 can be lowered and wheeled out of the baking chamber 12 through the doorway. The oven 10 may be a single integrated unit or may be formed by modules connected together, such as a baking chamber module and a heat exchanger module.

Figure 3:
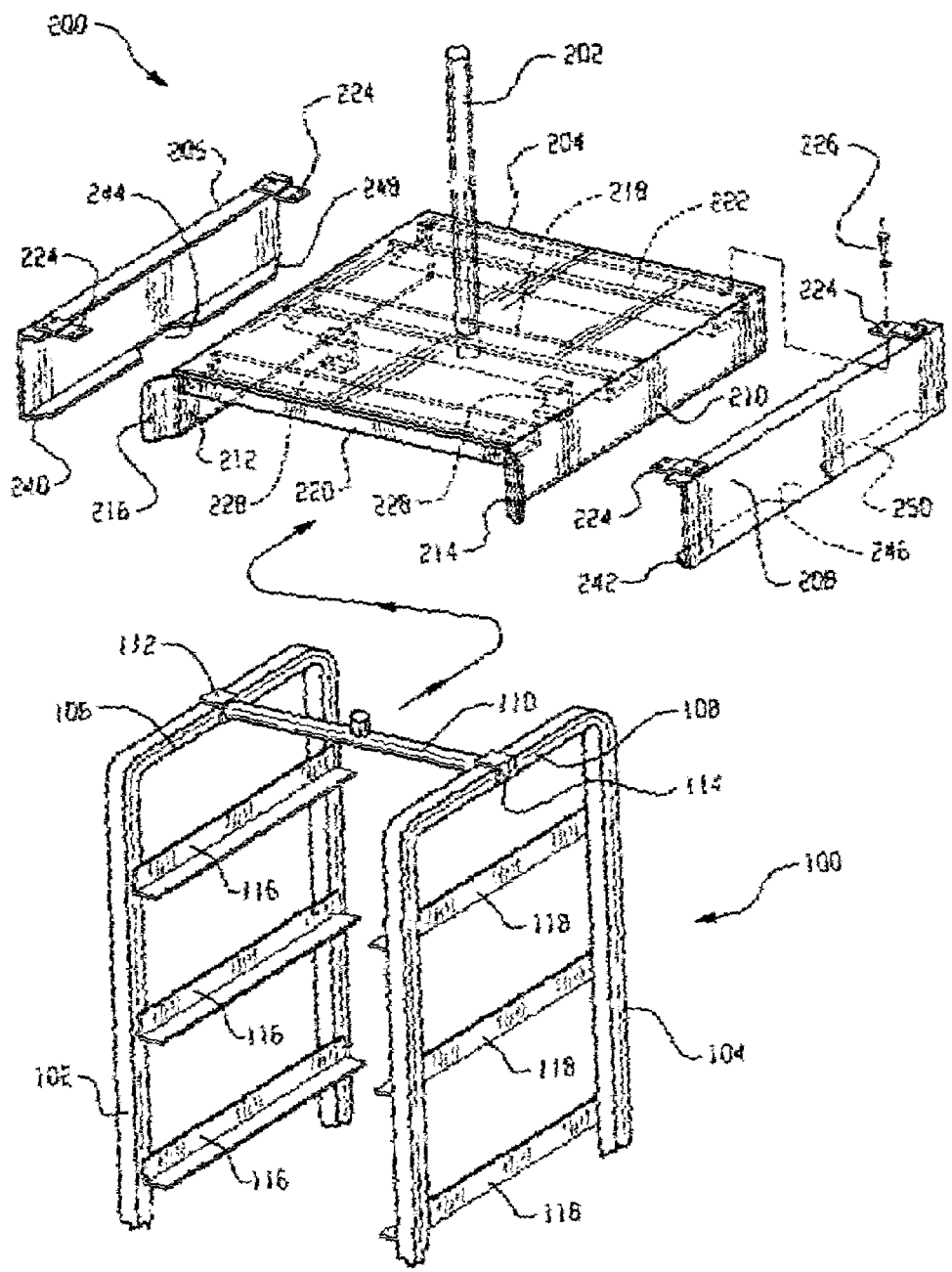
FIG. 3 is a perspective, partially exploded view of a rack carrier.
Figure 4:
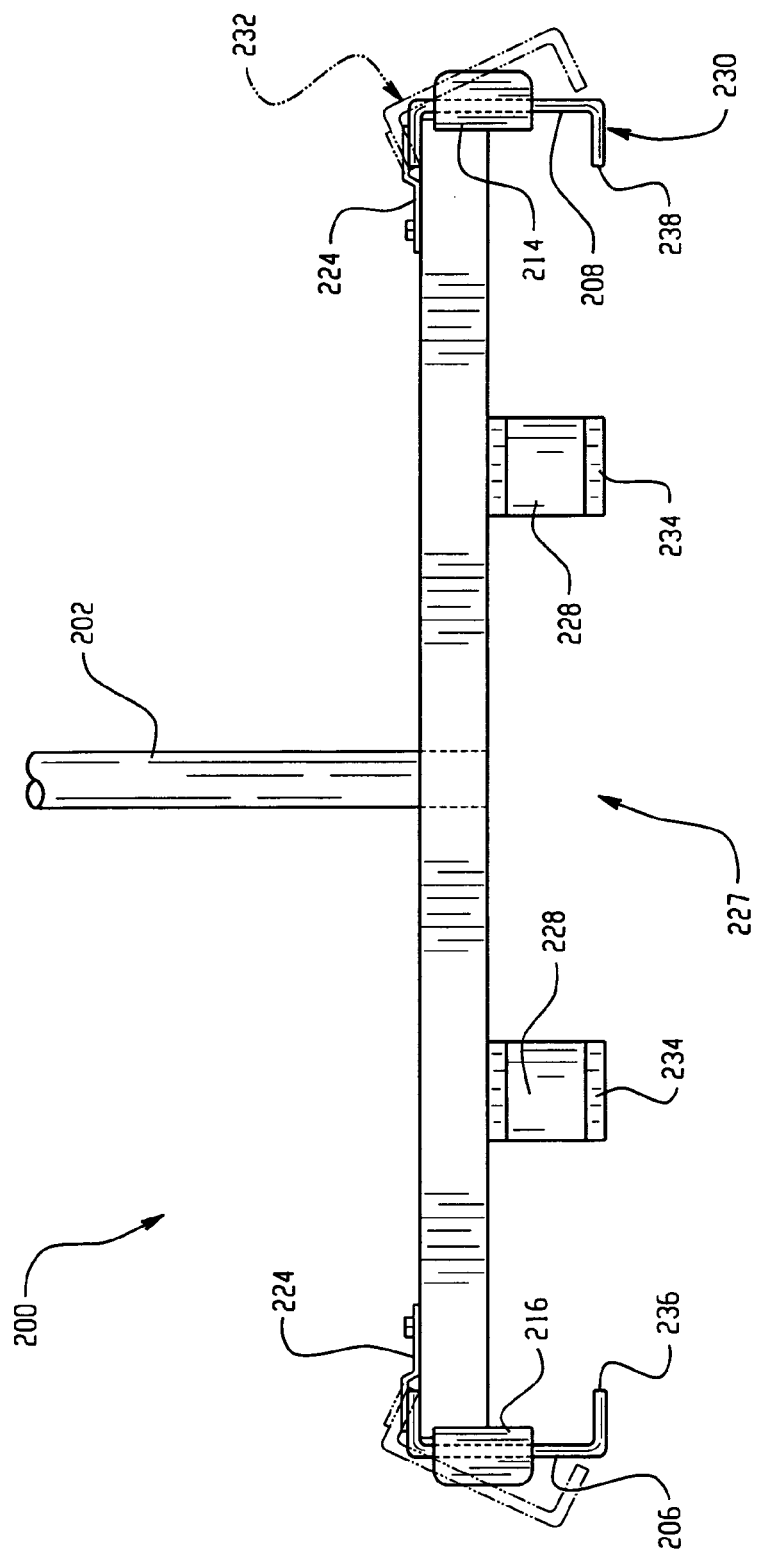
FIG. 4 is a front elevation view of the rack carrier of FIG. 3.

One embodiment of a novel rack carrier is shown in FIGS. 3 and 4. An upper part of a rack 100, shown only in FIG. 3, includes side frames 102 and 104 with respective upper side bars 106 and 108. An upper crossbar 110 extends between and connects the two side bars 106 and 108. The upper crossbar 110 may be welded directly to the side bars 106 and 108 or may be welded to respective brackets 112 and 114 that surround the side bars 106 and 108. Shelving brackets 116 and 118 are provided on the side frames 102 and 104 to receive trays of food products.

The illustrated rack carrier 200, shown in partially exploded perspective view in FIG. 3 and in assembled front elevation in FIG. 4, includes a shaft 202 connected with a main body 204. Spaced apart side supports 206 and 208 are located on either side of the main body 204. The main body 204 is formed by a metal plate with downwardly bent sides 210 and 212. The sides 210 and 212 may also include angled entry guides 214 and 216 at the front edges thereof. The shaft 202 may connect to the main body via a central brace 218, which may take the form of an elongated u-shaped bracket attached to the underside of the metal plate. Similar braces 220 and 222 may be provided at the front and rear portions of the metal plate as shown for increased structural strength and stability. In one example the braces may be connected to the metal plate by fasteners, while in another example a welding operation could be used. It is recognized that the main body 204 could take on other configurations, such as an open frame structure or tubular structure.

Each of the illustrated side supports 206 and 208 is movably connected to the main body 204 by spaced apart leaf spring members 224. Machine screw and lock washer combinations 226 may be used for connecting one side of the leaf springs 224 to the upper surface of the main body metal plate and the opposite side of the leaf springs 224 to the respective side support. Alternative fastening systems could be used. The leaf springs may be formed by stainless steel straps with an offset bend. The main body 204 and side supports 206 and 208 form a rack receiving channel 227, within which are located spaced apart brackets 228 that are sized to engage the crossbar 110 of the rack 100. The brackets 228 may be mounted to the central brace 218 by suitable mechanical fasteners or some other technique such as a welding operation. The leaf springs 224 bias the side supports 206 and 208 downward and toward the main body as seen by the illustrated rack holding positions 230, but enable the side supports to move outward and upward from the main body to shadow illustrated rack transfer positions 232. Other biasing structures or mechanisms could be used in place of the leaf springs. In a simpler variation the bias of the side supports into the rack holding positions 230 may be a gravity induced bias, with the side supports connected to the main body by a simple hinge.

When the rack 100 is engaged in the carrier 200 and the rack is lifted, lower lips 234 of the brackets 228 engage the underside of the crossbar 110 and lower lips 236 and 238 of the side supports 206 and 208 engage the underside of the side bars 106 and 108 respectively, providing multi-point lifting contact with the rack 100 for stability. The side supports 206 and 208 may include respective front parts or edges 240 and 242 that are angled or otherwise configured so as to interact with a top portion of the rack 100 (e.g. the rear vertical bars of the side supports) upon movement of the rack 100 into the channel thereby causing the side supports to move from their rack holding positions to their rack receiving positions. The side supports spring back to their rack holding positions when the rack is fully inserted into the channel. A central part of each lip 236 and 238 may be notched or otherwise recessed as shown at 244 and 246 if needed or desired to accommodate or avoid brackets 112 and 114. The side supports may also includes respective rear parts or edges 248 and 250 that are angled or otherwise configured so as to interact with a top portion of the rack 100 (e.g. the rear vertical bars of the side supports) upon removal of the rack 100 from the channel thereby causing the side supports to move from their rack holding positions to their rack receiving positions. The notched portions 244 and 246 may include similar angled parts to interact with the rack in a similar manner during both rack insertion and rack removal.

It is to be clearly understood that the above description is intended by way of illustration and example only and is not intended to be taken by way of limitation. For example, while the embodiment of FIGS. 3 and 4 provides two spaced apart, movable side supports, it is recognized that in some instances only one of the side supports may be movable while the other remains stationary at all times. Further, in some instances only a single side support may be necessary. As another example, while the embodiment of FIGS. 3 and 4 provides side supports that move both outward and upward when moving between the rack holding position and the rack transfer position, it is recognized that in an alternative embodiment the side supports could be mounted to the main body in a manner to permit only outward movement of the side support relative to the main body (e.g., a sliding movement). In another variation the side supports could be biased into their rack transfer positions and an actuator assembly could be provided within the channel to be engaged by the rack when the rack is inserted therein, the actuator assembly moving the side supports to their rack holding positions when the rack is fully inserted within the channel. As a further example, while the illustrated embodiment shows brackets 228 within the channel that are configured to engage the underside of the crossbar of the food product rack, it is recognized that in some applications the brackets could be eliminated. In place of the brackets one or more stops could be positioned within the channel to engage the crossbar or other structure of the food product rack to limit the inward movement of the rack into the channel (e.g., the lips 234 of the brackets 228 could be eliminated). Other changes and modifications could be made, including both narrowing and broadening variations and modifications of the appended claims of this application.

What is claimed is:

1. A rack oven, comprising:
   a chamber for receiving a rack;
   a door providing access to the chamber; and
   a rack carrier for engaging a food product rack, the rack carrier comprising:
      a rotatable output member extending from the top of the chamber,
      a main body connected for rotation with the rotatable output member, the main body and at least one side support defining a rack receiving channel, the side support movably connected with the main body for movement between a rack holding position relative to the main body and a rack transfer position in which the side support is moved at least outward from the main body, the side support biased into one of the rack holding position and the rack transfer position, and at least one stop within the channel for engaging a top portion of a rack to limit its movement into the channel.

2. The rack oven of claim 1 wherein the side support is biased into the rack holding position.

3. The rack oven of claim 2 wherein the at least one side support comprises a first side support movably connected with a first side of the main body and a second side support movably connected with a second side of the main body, the first side support biased into a rack holding position relative to the main body and movable at least outward from the main body to a rack transfer position, the second side support biased into a rack holding position relative to the main body and movable at least outward from the main body to a rack transfer position.

4. The rack oven of claim 1 wherein an entry part of the channel is defined in part by spaced apart alignment guides located at opposite sides of the entry part.

5. The rack oven of claim 4 wherein the spaced apart alignment guides are connected with the main body.

6. The rack oven of claim 1 wherein the side support is connected to the main body by at least one biasing mechanism.

7. The rack oven of claim 1 wherein the side support is biased into the rack holding position by gravity.

8. The rack oven of claim 1 wherein the side support is movable both outward and upward from the main body.

9. The rack oven of claim 8 wherein the side support is connected to the main body by one or more leaf spring members.

10. The rack oven of claim 1 wherein the side support includes a front edge part including a rack engaging surface configured to interact with a top portion of a rack upon movement of a rack into the channel thereby causing the side support to move from its rack holding position to its rack transfer position.

11. The rack oven of claim 10 wherein the side support includes a rear edge part including a rack engaging surface configured to interact with a top portion of a rack upon removal of a rack from the channel thereby causing the side support to move from its rack holding position to its rack transfer position.

12. The rack oven of claim 1 wherein the at least one stop comprises at least first and second spaced apart support brackets.

13. A rack oven, comprising:
   a chamber;
   a door providing access to the chamber; and
   a rack carrier engaged with a food product rack, wherein:
      the food product rack includes a top portion with laterally spaced first and second side bars;
      the rack carrier includes a first side support with a lip engaging an underside of the first side bar and a second side support with a lip engaging an underside of the second side bar.

14. The rack oven of claim 13 wherein the rack carrier includes a main body and the first side support and second side support are each movably connected to respective side parts of the main body.

15. The rack oven of claim 13 wherein the first side support and second side support are biased into positions in which they respectively engage the first side bar and second side bar.

16. The rack oven of claim 13 further comprising at least one stop adjacent a crossbar that connects the laterally spaced first and second side bars, the stop limiting further movement of the rack into the rack carrier.

* * * * *